Patented Aug. 12, 1930

1,772,620

UNITED STATES PATENT OFFICE

KARL WILKE, KARL THIESS, AND OTTO BRAUNSDORF, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

DERIVATIVES OF THE PYRAZOLANTHRONE AND PROCESS OF PREPARING THEM

No Drawing. Original application filed October 10, 1927, Serial No. 225,388, and in Germany October 22, 1926. Divided and this application filed August 12, 1929. Serial No. 385,471.

Our present invention relates to derivatives of the pyrazolanthrone and a process of preparing them.

We have found that new derivatives of the pyrazolanthrone of the following general formula:

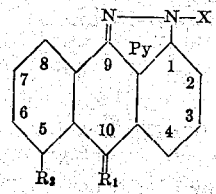

wherein X stands for a substituted or unsubstituted residue of the group consisting of the benzene, naphthalene or anthraquinone series, $R_1$ stands for oxygen,
$R_2$ stands for hydrogen or
$R_1$ and $R_2$ together stand for

are obtainable by treating pyrazolanthrone or a pyrazolanthrone wherein the hydrogen atom of the NH-group is substituted by any metal, or their substitution products in a suitable manner with halogen-substitution products of the group consisting of the benzene-, naphthalene- or anthraquinone series. Among the compounds in question we may mention for instance: Halogen-benzenes, nitrohalogen-benzenes or nitrohalogen-naphthalenes, ortho-halogen carboxylic acids of the benzene-, naphthalene- or anthraquinone series, 1-chloro-2-methylanthraquinone or the like. The reaction is preferably carried out in an organic solvent with addition of one of the known agents capable of promoting the splitting off of halogen hydride and with addition of a catalyst, such as copper powder, copper salts and vanadium salts or the like. In certain cases the application of pressure is required.

The new bodies obtained by the process above set forth are of great value in the manufacture of dyestuffs.

The following examples serve to illustrate our invention but they are not intended to limit it thereto; the parts being parts by weight:

(1) Equal parts of pyrazolanthrone, bromobenzene and potassium carbonate are heated to boiling in the reflux condenser for 10 hours, while stirring, in 10 parts of nitrobenzene in the presence of a small quantity of copper salt. After cooling, the mass is diluted with alcohol, filtered and washed with alcohol and water and dried. The resulting phenylpyrazolanthrone has the following formula:

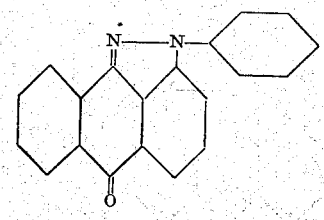

It crystallizes from glacial acetic acid in the form of beautiful large yellow crystalline needles which melt at 211° C. In concentrated sulfuric acid the product dissolves with a red color without any fluorescence, in an organic solvent with a more or less intense yellow fluorescence.

(2) 11 parts of pyrazolanthrone, 10 parts of o-bromo-benzoic acid, 10 parts of anhydrous potassium acetate, 0,5 part of copper acetate, 0,1 part of copper powder are introduced, while stirring, into 100 parts of amyl alcohol and the mixture is gradually heated to boiling and kept so for about 12 hours. A part of the product separates in the course of the reaction as a yellow potassium salt and another part remains dissolved in the amyl alcohol as the free base. In order to work up the product, it is advantageous to expel the amyl alcohol by means of steam immediately from the reaction mixture after having added thereto water and sodium carbonate, then to filter from the dark-yellow solution of the sodium salt any pyrazolanthrone which may have remained undissolved and unattacked and to precipitate the latter by means of a dilute mineral acid. The phenylpyrazolanthrone-ortho-carboxylic acid then precipitates as a yellow flocculent precipitate and, after being dried, forms a yellow powder. By recrystallization for instance from glacial acetic acid, it can be easily purified and then melts at 262° C.-265° C. In a dilute solution of sodium carbonate it readily dissolves even in the cold with a yellow color; it dissolves in concentrated sulfuric acid to an orange solution with a slightly yellowish fluorescence. The phenylpyrazolanthrone-ortho-carboxylic acid dissolves in chlorosulfonic acid at first to an orange-yellow solution which in a few seconds turns dull brown and finally greenish.

(3) There are treated and subjected to reaction as indicated in Example (2) the following parts of the respective compounds:

22 parts of pyrazolanthrone
16 parts of ortho-chlorobenzoic acid
20 parts of dehydrated potassium acetate
1 part of copper acetate
0,1 part of copper powder.

The derivatives of the pyrazolanthrone obtainable according to Examples (2) and (3) are identical; they have the following formula:

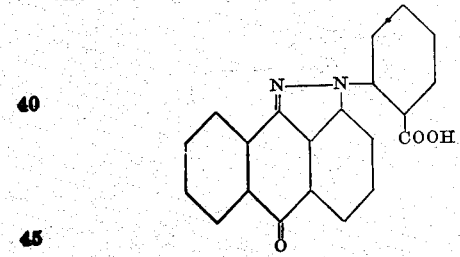

(4) There are treated and subjected to reaction as indicated in Example (2) the following parts of the respective compounds:

22 parts of pyrazolanthrone
22 parts of 2-chlor-3-naphthoic acid
15 parts of potassium acetate
1 part of copper acetate
0,5 part of copper in
200 parts of amyl alcohol.

After filtration the amyl alcohol is removed. The residue is then dissolved in sodium carbonate. By treating this solution with an acid a light-yellow precipitate is produced. The dried product is a light-yellow powder which, after recrystallization from glacial acetic acid, melts at 277° C. to 279° C. with effervescence (splitting off of $CO_2$).

Its solution in concentrated sulfuric acid is of an orange color with a slight fluorescence. Its behaviour towards chlorosulfonic acid is quite similar to that of the phenylpyrazolanthrone-ortho-carboxylic acid. It has the following formula:

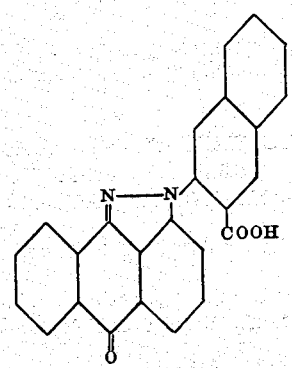

(5) 45 parts of pyrazolanthrone, 38 parts of ortho-chlor-nitrobenzene, 30 parts of anhydrous potassium carbonate, 2 parts of copper carbonate and a minute quantity of copper powder are introduced together into 400 parts of nitrobenzene, while stirring.

The mixture is slowly heated to a temperature of approximately 200° C. and kept at this temperature until the reaction is complete. After cooling, the mass is filtered by suction, freed from nitrobenzene by washing and again washed with hot water for removing the inorganic salts. The product of the condensation remains as a yellow powder. It can be easily recrystallized from organic solvents of high boiling point, such for instance as chlorobenzene and then forms very minute yellow prisms melting at 246° C. to 248° C. The product dissolves in concentrated sulfuric acid to a yellowish-red solution with a brownish fluorescence. The new derivative of the pyrazolanthrone corresponds to the following formula:

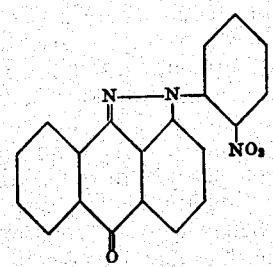

(6) 45 parts of pyrazolanthrone, 25 parts of alpha-chlor-anthraquinone, 30 parts of potassium carbonate with a small quantity of a copper salt added thereto are heated for about 12 hours, while stirring, in 400 to 500 parts of nitrobenzene until the solvent begins to boil gently. After cooling, the mass is diluted with ethyl alcohol, filtered by suction and washed with alcohol and hot water. The N-alpha-anthraquinonyl-pyrazolanthrone is left as a yellowish-brown powder, which dissolves in concentrated sulfuric acid with a yellowish-red color.

By addition of alkaline hydrosulfite a brownish-red vat is obtained from which cotton fiber is dyed very faint yellowish tints. The product corresponds to the formula:

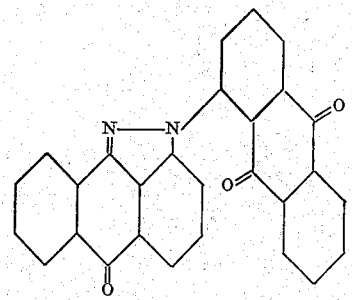

(7) 45 parts of pyrazolanthrone, mixed with 24 parts of 1.5-dichloro-2.4-dinitrobenzene, 15 parts of anhydrous potassium carbonate, 1 part of copper carbonate and a minute quantity of copper powder, are introduced into 450 parts of nitrobenzene at 190° C. to 200° C. and stirred therein for a considerable time. After the resulting mass has been worked up in the manner explained in the foregoing examples, a product free from chlorine is obtained which, as is proved by its analysis and properties, has been formed by the exchange of the two Cl-atoms of the dichlordinitrobenzene for the pyrazolanthrone residue. The product forms a yellow powder which dissolves in concentrated sulfuric acid with a yellow color. In organic solvents of high boiling point, such as nitrobenzene, it is only soluble with great difficulty. The new product corresponds to the following formula:

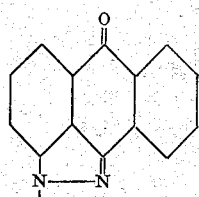

(8) Equal parts of pyrazolanthrone and alpha-brom-naphthalene are heated in about 8 times the quantity of nitrobenzene to which the calculated quantity of anhydrous potassium carbonate and a minute quantity of copper carbonate has been added, until the reaction is complete. The mass is allowed to cool, then filtered with suction, washed free from nitrobenzene with alcohol and for removing any inorganic salts with dilute hydrochloric acid and finally with hot water. There is left a yellowish-brown residue which constitutes the N-1'-naphthylpyrazolanthrone of the following formula:

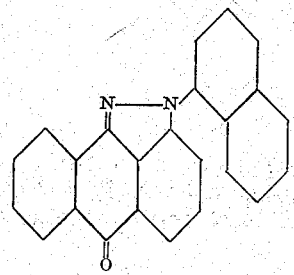

This compound melts only above 300° C. and dissolves in concentrated sulfuric acid with a yellowish-red color.

(9) 10 parts of 1.5-dipyrazolanthrone, 15 parts of ortho-chlorobenzoic acid, 20 parts of potassium acetate, one part of copper acetate and a minute quantity of copper powder are heated to boiling for a considerable time, while stirring, in 200 parts of amyl alcohol. The solvent is removed by steam distillation and from the residue the product of the reaction is extracted by boiling with a dilute solution of sodium carbonate. When acidified, the product precipitates from the alkaline filtrate as a yellow precipitate. It dissolves in dilute alkalies with a yellow color, in concentrated sulfuric acid with a yellow color and in choloro-sulfonic acid also with a yellow color which, however, in a few seconds changes first to red, then to violet and finally to a pure blue color. From this blue solution the product can no longer be precipitated unaltered.

We wish it to be understood that the expression "anthraquinone series" in the following claims is not intended to include products of the benzanthrone series.

This application is a division of our copending U. S. patent application Ser. No. 225,388 filed on October 10, 1927.

We claim:

1. As new products, the derivatives of the pyrazolanthrone of the following formula:

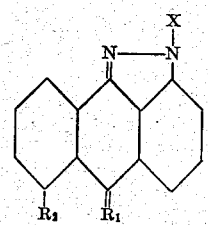

wherein X stands for a substituted or unsubstituted residue of the group consisting of the benzene, naphthalene or anthraquinone series, $R_1$ for oxygen, $R_2$ for hydrogen or $R_1$ and $R_2$ together stand for

2. As new products, the derivatives of the pyrazolanthrone of the following formula:

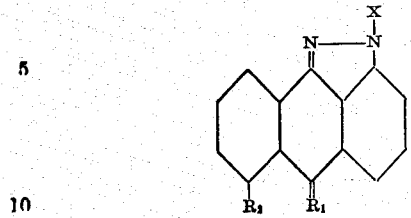

wherein X stands for a substituted or unsubstituted benzene-residue, $R_1$ for oxygen, $R_2$ for hydrogen or $R_1$ and $R_2$ together stand for

3. As new products, the derivatives of the pyrazolanthrone of the following formula:

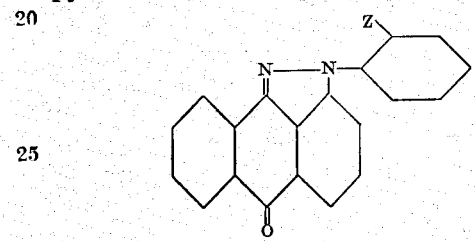

wherein Z stands for hydrogen, the carboxy group or the nitro group.

4. As a new product, phenyl-pyrazolanthrone-ortho-carboxylic acid which, when recrystallized from glacial acetic acid, forms a yellow powder melting at from 262° C. to 265° C. and dissolving in concentrated sulfuric acid to an orange solution of a slightly yellowish fluorescence.

In testimony whereof, we affix our signatures.

KARL WILKE.
KARL THIESS.
OTTO BRAUNSDORF.